Patented Feb. 23, 1926.

1,574,642

UNITED STATES PATENT OFFICE.

IDA M. CUSTER, OF RAHWAY, NEW JERSEY.

LUBRICATING COMPOSITION.

No Drawing. Application filed January 28, 1921, Serial No. 440,756. Renewed October 29, 1925.

*To all whom it may concern:*

Be it known that I, IDA M. CUSTER, a citizen of the United States, residing at Rahway, in the county of Union and State of New Jersey, have invented certain new and useful Improvements in Lubricating Composition, of which the following is a specification.

This invention is a novel lubricating composition applicable particularly for use in those relations where a high penetrative quality requires to be combined with a lubricating effect which is more positive and permanent than is obtainable from oil or grease films or the like, typical examples being the lubrication of automobile-spring leaves, the freeing of rust-bound surfaces such as tire rims, nuts, etc. etc.

My novel composition comprises graphite which has been reduced to the colloidal state by the known processes of deflocculation (see for example U. S. patents to E. G. Acheson, Nos. 844,989, 911,358, 966,636, etc.); and a substantially non-volatile but highly penetrating liquid vehicle capable of carrying the deflocculated graphite in suspension and preferably consisting of a mixture of mineral and animal oils or greases.

Following is a specific example in accordance with my invention, it being clearly understood that the invention is not restricted to the precise grades or qualities of materials mentioned or to the particular proportions specified.

Approximately 1 pint of deflocculated graphite in the form of the commercial oil paste is mixed with 2 quarts of lard and 4 quarts of the product commercially known as red oil or red engine oil, a crude oil distillate of lubricating grade. The mixture is warmed to about the melting point of the lard and thoroughly blended. I then add with stirring 8 quarts of coal tar oil of the grade known as special heavy (Barrett) and 6 quarts of kerosene. This coal tar oil is also widely known as "creosote oil."

The above components blend to a homogeneous, mobile, highly penetrative composition, which when applied to contacting or rust-bound surfaces, as spring leaves, etc., penetrates the interstices and forms therein a graphitic deposit or surface which not only prevents squeaking but acts as a substantial preventive of rust.

I claim:—

1. A mobile penetrative fluid lubricating composition, comprising deflocculated graphite and coal tar oil.

2. A penetrative fluid lubricating composition, comprising deflocculated graphite, coal tar oil, kerosene and lard.

3. A penetrative fluid lubricating composition, comprising deflocculated graphite, coal tar oil, kerosene, lard and red oil.

4. A fluid lubricating composition comprising approximately by volume:

Deflocculated graphite paste____ 1
Lard _____ 4
Red oil _____ 8
Kerosene _____ 12
Coal tar oil _____ 16

In testimony whereof, I affix my signature.

IDA M. CUSTER.